(12) United States Patent
Henderson

(10) Patent No.: US 7,938,374 B2
(45) Date of Patent: May 10, 2011

(54) PORTABLE CLAMP

(76) Inventor: Jeremy P. Henderson, Ste. Genevieve, MO (US)

( * ) Notice: Subject to any disclaimer, the term of this patent is extended or adjusted under 35 U.S.C. 154(b) by 415 days.

(21) Appl. No.: 11/850,378

(22) Filed: Sep. 5, 2007

(65) Prior Publication Data

US 2009/0057973 A1    Mar. 5, 2009

(51) Int. Cl.
*A47F 7/00* (2006.01)
(52) U.S. Cl. ........... 248/229.17; 248/229.16; 248/218.4; 248/224.8
(58) Field of Classification Search ............... 248/218.4, 248/229.1, 229.17, 229.13, 229.14, 229.15, 248/224.7, 224.8, 222.21
See application file for complete search history.

(56) References Cited

U.S. PATENT DOCUMENTS

| 2,861,765 A | * | 11/1958 | Kolb | 248/218.4 |
| 4,256,281 A | * | 3/1981 | Harris et al. | 248/230.9 |
| 5,857,651 A | * | 1/1999 | Kunevicius | 248/230.8 |

* cited by examiner

*Primary Examiner* — Terrell Mckinnon
*Assistant Examiner* — Steven M Marsh
(74) *Attorney, Agent, or Firm* — Charles McCloskey

(57) ABSTRACT

A portable clamp has a hinged, two piece arm that folds for storage within a hollow stem. A first arm hingedly connects to a second arm where each has a curved shell sized for gripping the frame of a bicycle. The first arm and second arm have cooperating holes to admit pins for securing the first arm to the second arm. Opposite the hinge, the second arm fits perpendicularly into the stem. A buckle secures a strap that passes around an object. In use, a cyclist releases the clamp from the stem. The cyclist places the strap around the upright object at a desirable height. The cyclist places the end of the strap in the buckle and cinches the strap. Using a pin, the cyclist secures the clamp within the stem. The cyclist places the arm around a bicycle frame member then secures a pin through the arm and into the stem. The bike is then supported at a convenient height.

10 Claims, 6 Drawing Sheets

PORTABLE CLAMP

BACKGROUND OF THE INVENTION

The portable clamp generally relates to mechanical clamps and vises and more specifically to a two piece clamp that straps upon a vertical object.

In the late 1800s, the bicycle liberated people from foot transportation. People use bikes for pleasure and commerce of all kinds around the world. Bicycles have evolved from models with an enormous front wheel and a small back wheel upon an armature to bikes of the present day with a generally triangular frame with forks at each end to hold the wheels and to steer the front wheel. Bikes have even developed into multiple seat versions, reclining models, and advanced racing cycles.

Early bikes had wheels with flat metal rims similar to tractors and thus a bumpy ride. Bicycle wheels evolved to inflatable tires upon matching rims and to tires containing inner tubes. Some racing bikes have returned to a solid, disc like wheel upon a suspension system. However, most recreational bikes have two wheels with inner tubes and inflatable tires. From time to time, an inflated tire encounters a road hazard or rough handling, and the tire goes flat.

Traditionally, riders have changed flat tires on bikes by raising and inverting the frame so the handlebars and sear are upon the ground and the wheels are upwards. On more advanced bicycle models, gear shift levers, brake handles, lights, and other accessories near the handle bars can be damaged when a bike is inverted. For some bike riders, particularly for mountain bikes and for long distances, weight and compact storage of cargo becomes important.

DESCRIPTION OF THE PRIOR ART

Beyond inverting a bike frame, people have sought to change tires and perform maintenance on a bike in various ways. Shops have stands with waist level poles that include a clamp to grasp a tubular bike frame member. However, such stands prove poorly mobile. People have fabricated mobile stands upon tripods or other mounts however those too have been cumbersome. Riders have sometimes leaned a bike against a motor vehicle, such as a pickup truck or all terrain vehicle. Yet such leanings leave the bike wheels upon the ground and may damage the vehicle. In rugged or remote locations, a vehicle may not be present. In some places, riders may place a bike strategically in a tree notch or fence post frame. Such a placement though can be hard to find and may damage the bike's frame.

In recent years, serious cyclists have sought out ways and means to work upon the derailieurs, wheels, and tires of bicycles without inverting a bicycle upon its handlebars and seat, damaging both. Existing stands have proven expensive, oversize, and bulky. The characteristics of existing stands do not lend themselves well for compact, lightweight, and portable use by cyclists in rugged or remote locations.

The present invention overcomes the difficulties of the prior art. That is, the present invention has utilized a compact frame of minimum parts that temporarily secures to an upright object, such as a tree, fence post, rock, power pole, and the like by straps or other temporary devices. The present invention fits within the under seat bag of a cyclist. The present invention allows last minute tuning and adjusting of a bike during a race. For more leisurely cycling, a cyclist can repair a bike while standing, thus preventing an aching back. Bicycles held by the present invention upon an upright object minimize their contact with the dirt, mud, and grit upon the ground. Additionally, prior clamps have not resisted torsion and have rotated to drop a bike which the present invention avoids.

SUMMARY OF THE INVENTION

Generally, the present invention is a portable clamp where a two piece arm folds for storage within a hollow stem. A first arm hingedly connects to a second arm where each has a curved shell sized for gripping the frame of a bicycle. The first arm and second arm have cooperating holes to admit pins for securing the first arm to the second arm after grasping a frame or for nesting both arms within the stem as during storage. Opposite the hinged connection, the second arm fits its end into an aperture in the stem that is opposite a buckle. The buckle secures both the fixed and free ends of a strap where the strap positions the invention upon an upright object, or tree, or a horizontal object, or branch.

For use, a cyclist pulls out two pins to release the clamp from the stem. The cyclist then removes the clamp from the stem and opens the arm from the clamp. The cyclist places the strap around the upright object at a desirable height, with the aperture facing outwardly from the upright object. The cyclist places the end of the strap in the buckle and cinches the strap tight. The cyclist then places the clamp into the aperture with the arm outwards from the stem. Using a pin, the cyclist secures the clamp within the aperture. After lifting the bike, the cyclist places the arm around a bicycle frame member and returns the arm to the stem. The cyclist then secures one pin through the arm and into the stem. The bike is then supported upon the upright object and ready for the cyclist to repair, adjust, or tune as needed.

There has thus been outlined, rather broadly, the more important features of the invention in order that the detailed description thereof that follows may be better understood and that the present contribution to the art may be better appreciated. The present invention also includes round shaped channels, steeper incline to the flanges, and a round shape to the tray. Additional features of the invention will be described hereinafter and which will form the subject matter of the claims attached.

Numerous objects, features and advantages of the present invention will be readily apparent to those of ordinary skill in the art upon a reading of the following detailed description of the presently preferred, but nonetheless illustrative, embodiment of the present invention when taken in conjunction with the accompanying drawings. Before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, the phraseology and terminology employed herein are for the purpose of description and should not be regarded as limiting.

One object of the present invention is to provide a new and improved portable clamp for a cyclist to raise a bike above the ground using a nearby upright object.

Another object is to provide such a portable clamp that is lightweight and compact for storage under the seat of a bicycle.

Another object is to provide such a portable claim that connects to an upright object with a minimum of mechanical parts.

Another object is to provide such a portable claim that holds a bike at a comfortable height at which a standing cyclist can work.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In referring to the drawings.

The same reference numerals refer to the same parts throughout the various figures.

DESCRIPTION OF THE PREFERRED EMBODIMENT

Figure 1:
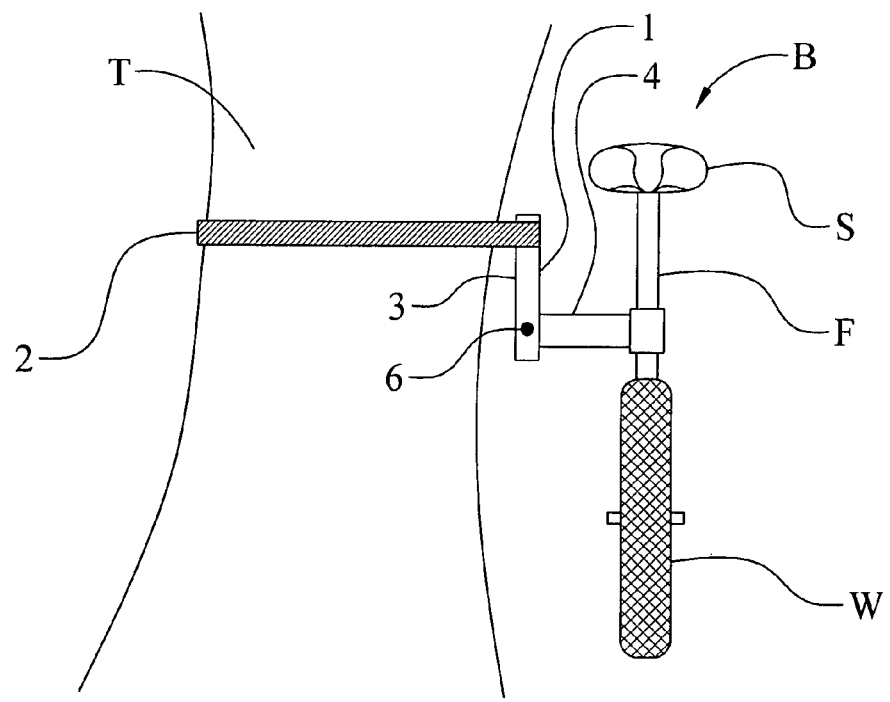
FIG. 1 illustrates a side view of the preferred embodiment of the present invention installed upon an upright object.

The present invention overcomes the prior art limitations and provides a portable clamp well suited for cyclists on rugged or remote terrain. The preferred embodiment of the present invention 1 is shown in FIG. 1 as during usage. The present invention is installed along side a vertical object, T, such as a tree, fence post, light pole, rock, and the like by placing a strap 2 or other flexible elongated means around the tree T. The strap has a fixed end 2a upon the clamp 1 and a free end 2b that wraps around the vertical object and then secures upon the clamp proximate the fixed end. The clamp has a stem 3 generally perpendicular to an arm 4 that extends perpendicular to the vertical object. The arm then grasps a member of the frame F of a bicycle B here shown with a seat S upon its own stem above a wheel W. The clamp 1 generally positions a bike B upright with the wheels W in a convenient position for maintenance and repair by a standing cyclist.

Figure 2:
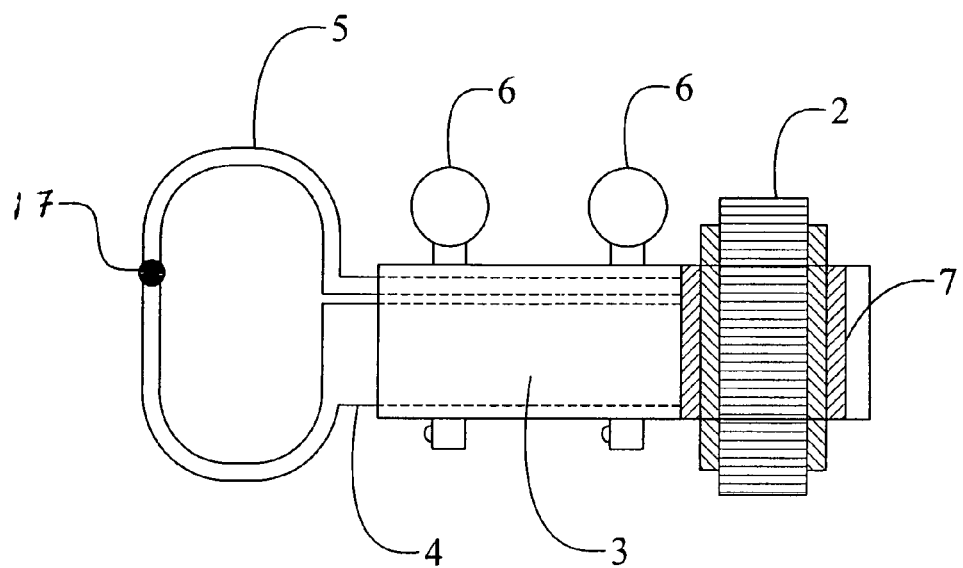
FIG. 2 shows a side view of the invention in stored form.

When not in use, the clamp 1 attains a compact form shown in FIG. 2. The stem 3 is generally hollow and has two ends. Upon one open end, the stem receives the arm 4 and a cooperating jaw 5 lengthwise inside of the stem, telescopically. The jaw connects to the arm upon a hinge 17. Upon its length, the stem has two pins 6 that pass through holes in registration within the jaw, the arm, and the stem. Near the other end of the stem, a releasable device, or buckle 7, joins to the surface of the stem, generally perpendicular to the pins 6. The buckle secures the fixed end 2a of the strap and permits the free end 2b to wrap around the buckle in a compact form.

Figure 3:
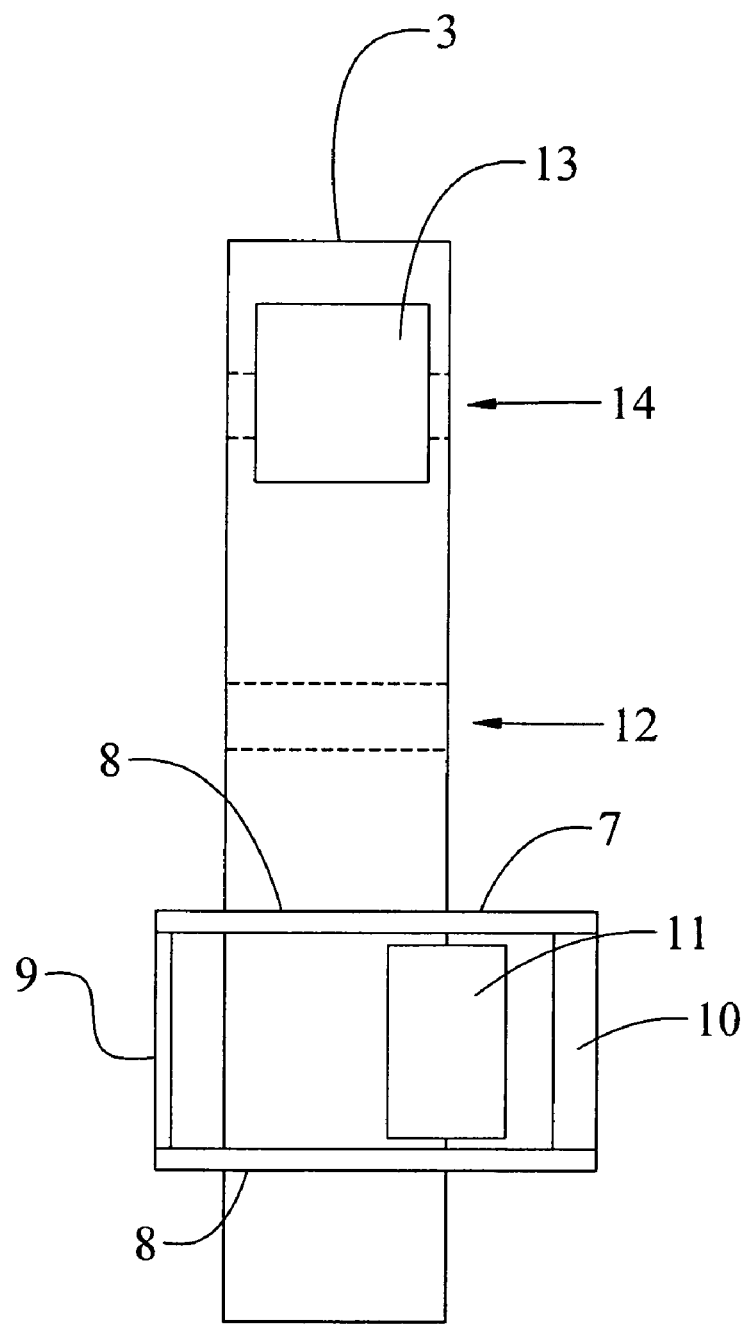
FIG. 3 shows a front view of the stem of the invention.

The stem appears then in FIG. 3 with the strap removed for the clarity of the description of the features of this part of the invention. The stem is generally hollow and allows for storage and removal of the arm therefrom. The stem has two opposite ends with the buckle 7 upon one end. Generally, the buckle has a rectangular form with two mutually parallel and spaced apart rails 8. The rails are generally perpendicular to the length of the stem and have two end outwardly of the stem. Upon one end of the rails, a tie down 9 spans between the rails. The tie down secures the fixed end 2a of the strap to the buckle. The tie down is generally perpendicular to the rails and opposite the tie down, a guide 10 spans between the rails and permits the strap to pass over the guide inwardly between the rails. Within the guide and the tie down, the buckle has a jaw 11 that pivots slightly upon an axis parallel to the guide and a spring biases the jaw generally upon the guide. The jaw is generally located proximate the guide so that the free end 2b of the strap binds when the jaw engages the guide. Once the free end is pulled through the jaw to a desired length, the spring of the jaw places the jaw firmly upon the free end to secure the strap from loosening, particularly when the stem is loaded with the weight of a bicycle. Depressing the jaw releases the free end so the stem can be removed from a supporting object and the clamp stowed. In the preferred embodiment, the buckle is spaced inwardly from the nearby end of the stem thus, preventing rotation of the stem away from the supporting object. Alternatively, the releasable device includes a clip or sections of hook and loop fastener.

Inwardly from the buckled upon the stem, a pin hole 12 extends through the stem generally parallel to the buckle and perpendicular to the length of the stem. The pin hole receives a pin 6 for securing the arm within the stem during storage of the clamp 1. Inwardly from the pin hole and opposite the buckle, the stem has an aperture 13 that receives the arm 4 when the clamp is closed and in use. The aperture opens and extends through the stem so that the axis of the aperture is perpendicular to the buckle and to the length of the stem. The aperture generally opens upon the same surface and side of the stem as the buckle and extends to the opposite side of the stem. The aperture has a shape that cooperates with the cross section of the arm when it is closed when the clamp is used to secure a bicycle. In the preferred embodiment, the aperture is square. Alternatively, the aperture is rectangular or round. Generally parallel to the pin hole, the stem has a stay slot 14 that also receives a pin 6. The stay slot extends through the stem to receive a pin inserted therein during usage. The arm fits into the aperture and a pin inserted through the stay slot secures the arm perpendicular to the stay slot and the stem.

Figure 4:
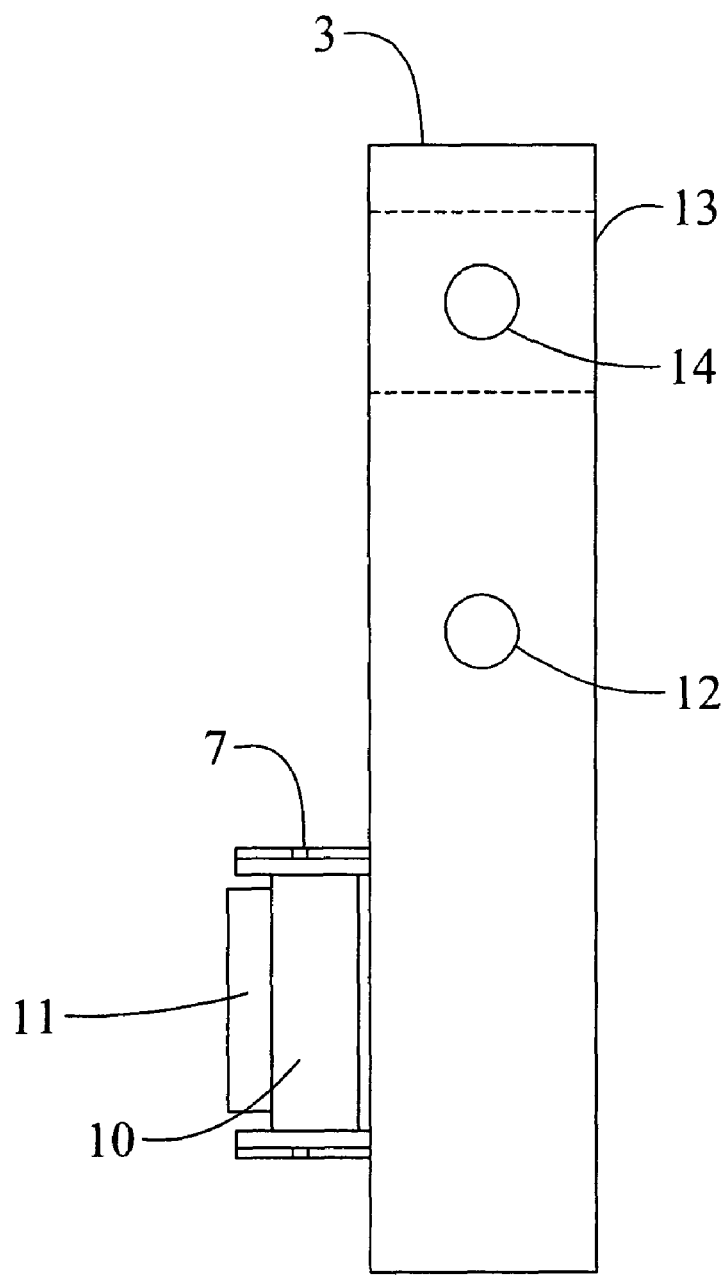
FIG. 4 describes a side view of the stem.

Turning the stem 3 in FIG. 4, the stem has the buckle 7 near one end. As before the buckle 7 has two rails, here seen on end, joined by a guide 10. Behind the guide, the jaw 11 also spans between the rails but in a biasing pivotal manner. The jaw grasps the free end 2b of the strap when inserted into the buckle for securing the clamp 1 upon a supporting object. Inwardly from the buckle, the pin hole 12 extends through the stem generally parallel to the buckle and perpendicular to the length of the stem, thus the open end of the pin hole is shown. Outwardly of the pin hole, the stay slot 14 extends through the stem parallel to the pin hole. The stay slot passes through the aperture 13 here shown in phantom as perpendicular to the stay slot and the pin hole. In the preferred embodiment, the stem has a hollow square cross section. Alternatively, the stem has a hollow round cross section, a solid round cross section, or a hollow round cross section.

Figure 5:
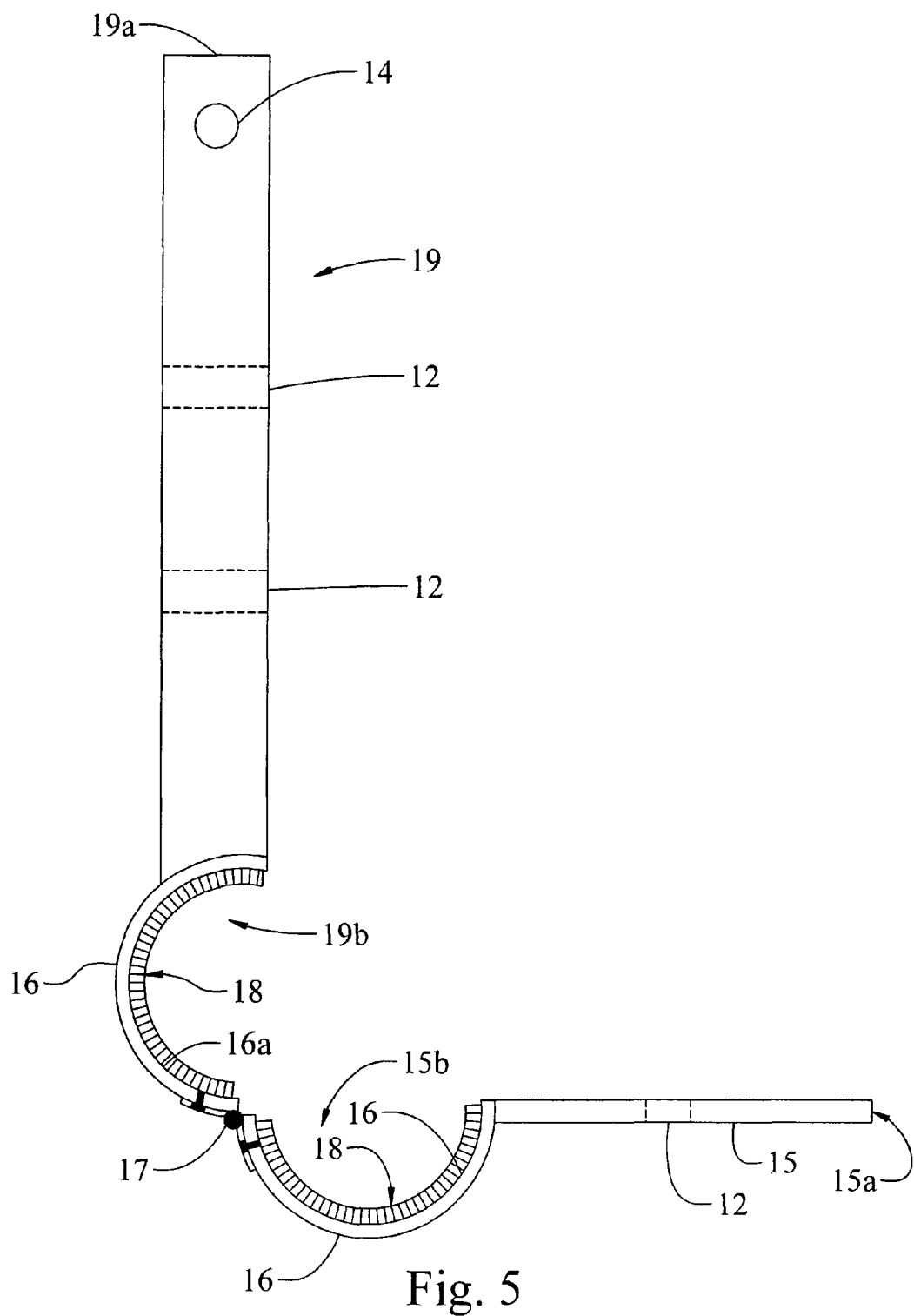
FIG. 5 portrays a side view of the arm and clamp when open.

The stem cooperates with the arm 4 to secure a bicycle within the clamp and the arm is shown in FIG. 5. The arm 4 has a first arm 15 having a free end and an opposite pivoting end. Between the free end 15a and the pivoting end 15b, the arm has an elongated shape generally thin in cross section. Inside of the free end, the first arm has a pin hole 12 that receives a pin 6 used to close the first arm into the arm 4. Inside of the pin hole, the first arm has a shell 16, generally arcuate in shape that descends from the length of the first arm. In the preferred embodiment the shell has a constant radius of curvature so that round bicycle frame members fit within the shell. Alternatively, the shells have a semi-circular, partially round, or arcuate cross section. Opposite the remainder of the first arm, the shell reaches the pivoting end at a hinged connection 17. In the preferred embodiment, the shell has an elastomeric cushion 18 attached to the concave, or interior face 16a, of the shell where the cushion receives a bicycle frame member and seeks to prevent scratching the frame member. The hinged connection pivots the first arm 15 from a second arm 19.

The second arm has a generally rectangular cross section of thickness greater than the first arm and of greater length than the first arm. The second arm has a free end 19a that generally inserts into the aperture of the stem. The cross section of the free end 19a cooperates with the shape of the aperture. Near the free end, the second arm has a stay slot 14 that cooperates with the stay slot on the stem and both stay slots receive a pin 6 for securing the second arm perpendicular to the stem as during usage. The stay slot is generally perpendicular to the length of the second arm and parallel to the axis of the hinged connection. Inward from the stay slot and generally centered upon the second arm, a pin hole 12 extend perpendicular to the length of the second arm and to the axis of the hinged connection. This pin hole secures the second arm within the stem when the arm 4 is nested within the stem 3 for stowage as during a period of non-usage of the invention. Inward of the previous pin hole, the second arm has a second pin hole 12 that is in registration with the pin hole of the first arm. The second pin hole of the second arm and the pin hole of the first arm are the same distance radially from the hinged connection 17. Opposite of the free end and outwardly of the second pin hole, the second arm 19 has a pivoting end 19b. Similar to the first arm, the pivoting end of the second arm includes a shell 16 depending below the length of the second arm. As in the first arm, the shell has an arcuate shape, here shown with a constant radius or circular, and the radius exceeds the thickness of the second arm. The shell also has a cushion 18 upon the interior concave surface 16a.

Figure 6:
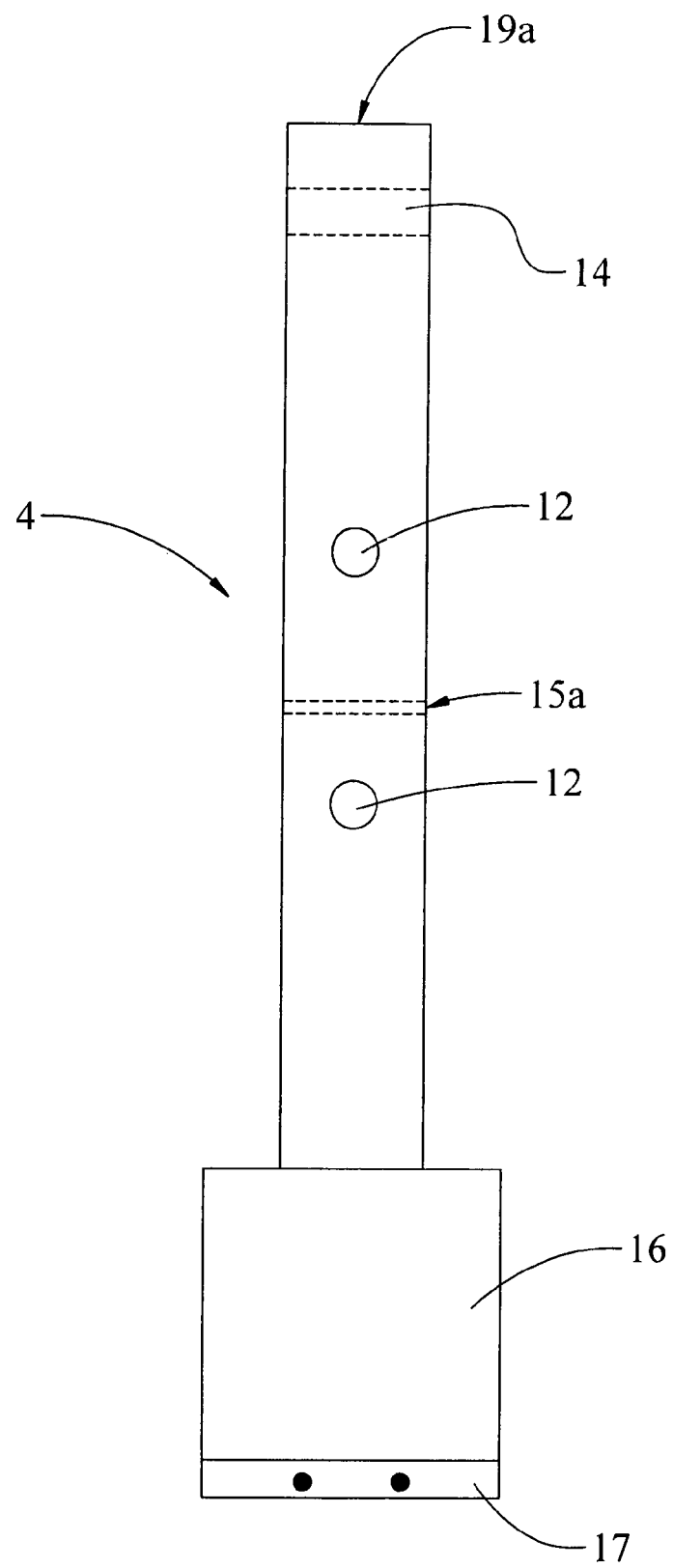
FIG. 6 portrays a front view of the arm and clamp when closed.

As shown in FIG. 1, when a cyclist desires to secure a bicycle, the frame member is positioned upon the cushion 18 of one of the first arm or the second arm and then the other arm is closed upon it. Both shells 16 then enclose the frame member within the arm 4 and a pin 6 is placed through the pin hole 12 of the first arm and the second pin hole 12 of the second arm closest to the shell. Turning the arm 4 when closed, FIG. 6 shows the arm from the side, though a frame member is not shown for clarity. The arm has a generally elongated shape with the second arm 19 here shown in the foreground. The second arm has a free end 19a and an opposite pivoting end 19b that includes the shell 16 as previously described. The shell has a greater length than the depth of the second arm, thus the shell appears wider in this figure and grips a frame member of a bicycle more firmly. At its outermost, the shell has the hinged connection 17 that allows the two halves of the shell to open and that releases the first arm 15 from behind the second arm 19. The first arm is located behind the second arm in this figure generally opposite from the free end 19a with the free end 15a shown in phantom.

Like before, the second arm has a free end with the stay hole 14 nearby. The longitudinal axis of the stay hole is generally parallel to the axis of the hinged connection and perpendicular to the length of the second arm. Inside from the stay hole, the second arm has a first pin hole 12, generally round and extending through the thickness of the second arm. The first pin hole is generally perpendicular to the length of the second arm and to the axis of the hinged connection, also perpendicular to the stay hole. Inwardly from the first pin hole, the free end 15a is shown behind the second arm. Further towards the shell, the second arm has the second pin hole 12 parallel to the first pin hole. The second pin hole cooperates with the pin hole in the first arm so that a pin 6 passes through both the second arm and the first arm. Both the first pin hole and the second pin hole are generally centered upon the arm 4.

Figure 7:
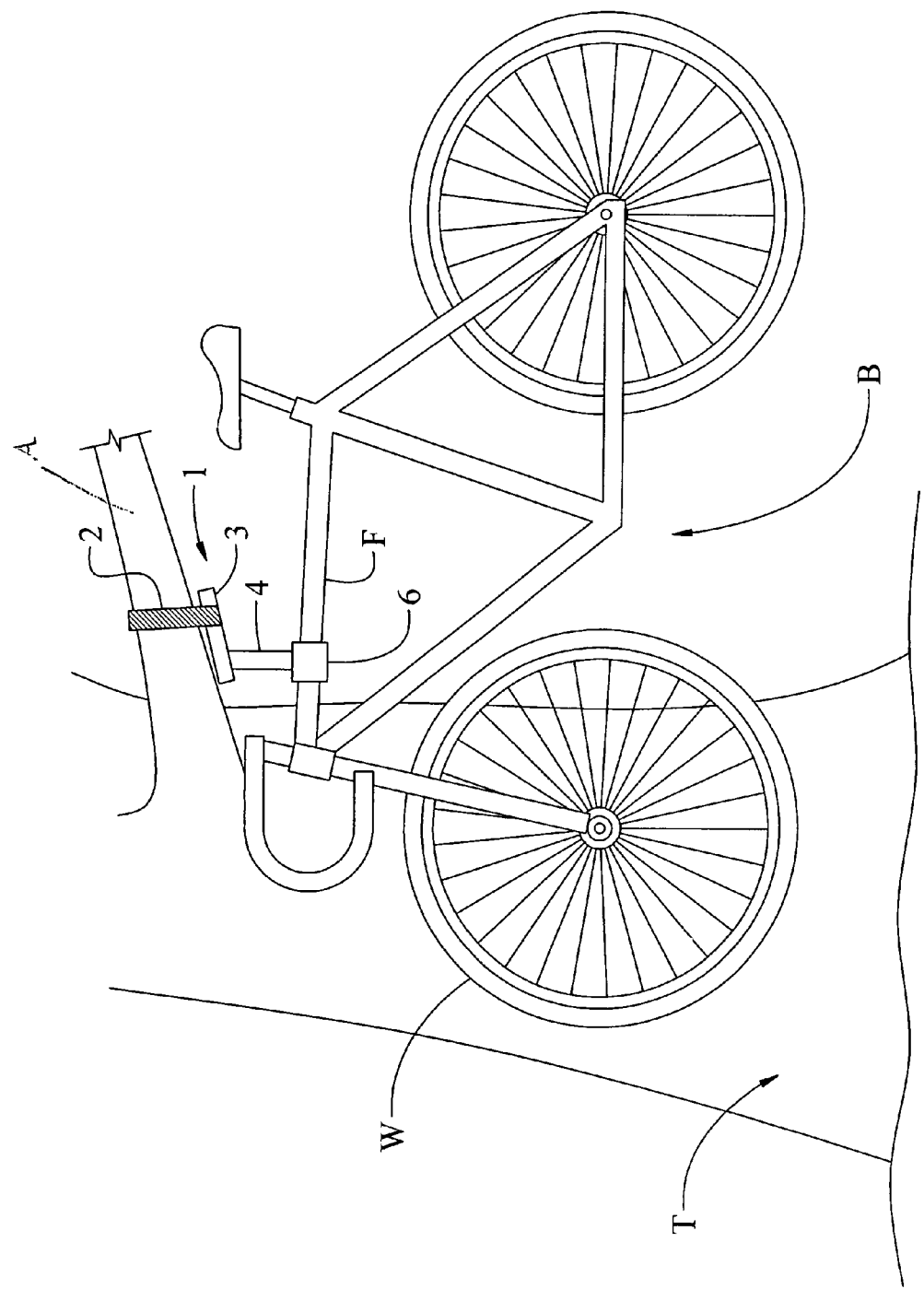
FIG. 7 illustrates a side view of the invention installed below a horizontal object.

Along with installation upon a vertical object, the present invention can be installed upon a horizontal object shown in FIG. 7. The clamp 1 hangs beneath a horizontal object, A, such as a branch of a tree, arm of a sign, frame of a basketball hoop, light pole, and the like by placing the strap 2 over and around the horizontal object A. A free end 2b of the strap wraps around the horizontal object, returns to the clamp over the fixed end 2a, and passes over the guide and beneath the jaw, thus securing the clamp beneath the branch and the like. The stem 3 extends generally parallel to the horizontal object and supports the arm as generally perpendicular to the stem from the end opposite the strap. The arm fits into the aperture 13 and a pin 6 placed through the stay hole 14 secures the arm within the stem against falling from the stem due to gravity. The arm then grasps a member of the frame F of a bicycle B here shown with a seat S generally towards the horizontal object and above a wheel W. The clamp 1 generally positions a bike B upright and relatively close to the horizontal object with the wheels W ready for maintenance and repair by a standing cyclist.

From the aforementioned description, a portable clamp has been described. The portable clamp is uniquely capable of holding a member of a bicycle frame from a vertical or horizontal object so that the bicycle is at a convenient height for repairs outside of a shop environment. Though hollow tube construction is described for components of the invention, solid cross sections are foreseen by the inventor. Though square shaped cross sections are also described for parts of the invention, the inventor anticipates round cross sections as well. The portable clamp and its various components may be manufactured from many materials, including but not limited to, aluminum, steel, polymers, high density polyethylene, polypropylene, ferrous and non-ferrous metals, their alloys, and composites.

As such, those skilled in the art will appreciate that the conception, upon which this disclosure is based, may readily be utilized as a basis for the designing of other structures, methods and systems for carrying out the several purposes of the present invention. Therefore, the claims include such equivalent constructions insofar as they do not depart from the spirit and the scope of the present invention.

I claim:

1. A portable clamping device that attaches to an object, vertical or horizontal, temporarily securing another object, comprising:

an elongated stem, generally having two ends;

an arm including a first arm hingedly connecting to a second arm, said second arm connecting to an end of said stem whereby said arm is generally perpendicular to said stem, said first arm and said second arm holding fast another object placed within said first arm and said second arm;

a flexible elongated member having two ends, one end fixed to said stem opposite where said arm connects to said stem and a free end opposite said fixed end, said free end passing around the object and returning to said fixed end for securement upon said stem;

said stem having a releasable device upon one end for attaching said fixed end of said elongated member and for receiving said free end of said elongated member and an aperture opposite said releasable device and extending through said stem;

said aperture having a stay slot therethrough generally parallel to said releasable device and perpendicular to the length of said stem, said aperture receiving said arm; and, at least one pin, said pin locating in said stay slot securing said arm within said aperture.

2. The portable clamping device of claim 1 wherein said releasable device is a buckle.

3. The portable clamping device of claim 1 further comprising:

said stem being hollow and receiving said arm telescopically.

4. The portable clamping device of claim 3 wherein said stem and said arm are both rectangular in cross section.

5. A portable clamping device that attaches to an object, vertical or horizontal, temporarily securing another object, comprising:

an elongated stem, generally having two ends;

an arm including a first arm hingedly connecting to a second arm, said second arm connecting to an end of said stem whereby said arm is generally perpendicular to said stem, said first arm and said second arm holding fast another object placed within said first arm and said second arm;

a flexible elongated member having two ends, one end fixed to said stem opposite where said arm connects to said stem and a free end opposite said fixed end, said free end passing around the object and returning to said fixed end for securement upon said stem;

said first arm having a narrow flat elongated shape with a free end and an opposite hinged end; and, said second arm having an elongated shape of greater thickness than said first arm with a free end and an opposite hinged end hingedly connected to the hinged end of said first arm.

6. The portable clamping device of claim 5 further comprising:

said first arm having a shell centered upon the hinged end;

said second arm having a shell centered upon the hinged end, and the shells of said first arm and said second arm closing upon another object holding it fast.

7. The portable clamping device of claim 6 further comprising:

said shells having a cushion upon the interior thereby protecting said other object and a length greater than the thickness of said second arm.

8. The portable clamping device of claim 6 wherein said shells are semi-circular in cross section.

9. The portable clamping device of claim 6 further comprising:

said first arm having at least one pin hole therethrough; and, said second arm having at least one pin hole therethrough in registration with said at least one pin hole of said first arm.

10. The portable clamping device of claim 9 comprising:

said first arm having one pin hole and said second arm having two pin holes wherein said pin hole of said first arm is in registration with the pin hole of said second arm closest to said shell and said pin holes of said second arm are generally perpendicular to said stay hole, and said first arm has a shorter length than said second arm.

* * * * *